US007842235B2

(12) United States Patent
Ocvirk et al.

(10) Patent No.: US 7,842,235 B2
(45) Date of Patent: Nov. 30, 2010

(54) TEST ELEMENT, SYSTEM, AND METHOD OF CONTROLLING THE WETTING OF SAME

(75) Inventors: Gregor Ocvirk, Mannheim (DE); Peter Kraemer, Deidesheim (DE); Wolfgang Fiedler, Laudenbach (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1054 days.

(21) Appl. No.: 11/057,524

(22) Filed: Feb. 14, 2005

(65) Prior Publication Data

US 2005/0254997 A1 Nov. 17, 2005

(30) Foreign Application Priority Data

Feb. 14, 2004 (DE) ........................ 10 2004 007 274

(51) Int. Cl.
*G01N 31/22* (2006.01)
*G01N 31/00* (2006.01)

(52) U.S. Cl. ............................ 422/57; 422/58; 422/55; 422/50

(58) Field of Classification Search .................. 422/57; 429/38; 204/450, 451, 454, 547
See application file for complete search history.

(56) References Cited

U.S. PATENT DOCUMENTS 3,640,267 A 2/1972 Hurtig et al.
4,426,451 A 1/1984 Columbus
4,636,785 A * 1/1987 Le Pesant .................... 345/37
4,868,129 A 9/1989 Gibbons et al.
5,104,813 A 4/1992 Besemer et al.
5,208,163 A 5/1993 Charlton et al.
5,230,866 A 7/1993 Shartle et al.
5,472,577 A 12/1995 Porter et al.

(Continued)

FOREIGN PATENT DOCUMENTS

DE 19629656 A1 7/1996

(Continued)

OTHER PUBLICATIONS

Morcos, Ikram, "Electroanalytical Chemistry and Interfacial Electrochemistry," *Electrocapillary Studies on a Partially Immersed Silver* Electrode, 20, (1969); pp. 479-481.

(Continued)

*Primary Examiner*—Walter D Griffin
*Assistant Examiner*—Christine T Mui
(74) *Attorney, Agent, or Firm*—Bose McKinney & Evans LLP

(57) ABSTRACT

The invention relates to a test element for the testing of a liquid sample. The test element includes a sample application area, a test field, a sample transport path extending between the sample application area and the test field and an actuator field including an electrically-conductive layer. The actuator field is switchable between a first state attracting the sample and a second state attracting the sample less by applying to the conductive layer an electric voltage that is different from an earth potential. The actuator field has a section that is arranged at about the same distance from the sample application area as the test field, measured along the sample transport path. Such that, a wetting of the test field by the sample can be controlled by applying a voltage to the actuator field.

46 Claims, 4 Drawing Sheets

U.S. PATENT DOCUMENTS

| | | | | |
|---|---|---|---|---|
| 6,001,231 | A * | 12/1999 | Kopf-Sill | 204/454 |
| 6,036,919 | A | 3/2000 | Thym et al. | |
| 6,488,827 | B1 | 12/2002 | Shartle | |
| 6,565,727 | B1 | 5/2003 | Shenderov | |
| 2002/0043463 | A1 | 4/2002 | Shenderov | |
| 2002/0079219 | A1 * | 6/2002 | Zhao et al. | 204/451 |
| 2002/0080920 | A1 | 6/2002 | Prins et al. | |
| 2002/0114715 | A1 | 8/2002 | Yoon et al. | |
| 2003/0006140 | A1 * | 1/2003 | Vacca et al. | 204/547 |
| 2003/0164295 | A1 | 9/2003 | Sterling | |
| 2003/0164395 | A1 | 9/2003 | Tong | |
| 2003/0203271 | A1 * | 10/2003 | Morse et al. | 429/38 |

FOREIGN PATENT DOCUMENTS

| | | | |
|---|---|---|---|
| EP | 0 470 438 | A1 | 2/1992 |
| EP | 1 035 920 | B1 | 7/2002 |
| WO | WO 02/07503 | A1 | 1/2002 |
| WO | WO 02/49507 | A1 | 6/2002 |
| WO | WO 03/045556 | A2 | 6/2003 |

OTHER PUBLICATIONS

Morcos, Ikram, "Electroanalytical Chemistry and Interfacial Electrochemistry", *The Electrocapillary Phenomena of Solid Electrodes*, 62, (1975), pp. 313-340.

Kim, CJ, "Proceedings of 2001 ASME International Mechanical Engineering Congress and Expositon", *Micropumping by Electrowetting*, (2001), pp. 1-8.

Welters, Wim J.J. and Kokkink, Lambertus G.J., "American Chemistry Society", *Fast Electrically Switchable Capillary Effects*, 14 (7), (1998), pp. 1535-1538.

Quinn, Anthony, Sedev, Rossen and Ralston, John, "American Chemistry Society", *Influence of the Electrical Double Layer in Electrowetting*, (2002).

Lee, Junghoon, Moon, Hyejim, Flwler, Jesse, Schoellhammer and Kim, Chang-Jin, "Elsevier Science", *Electrowetting and Electrowetting-on-dielectric for Microscale Liquid Handling*, (2002), pp. 259-268.

Sondag-Huethorst, J.A.M. and Fokink, L.G.J., "American Chemistry Society", *Potential-Dependent Wetting of Octadecanethiol-Modified Polycrystalline Gold Electrodes*, (1992), pp. 2560-2566.

Verheijen, H.J.J. and Prins, M.W.J., "American Chemical Society" *Reversible Electrowetting and Trapping of Charge: Model and Experiments*, (1999), pp. 6616-6620.

Hato, Masakatsu, "Chemistry Letters: The Chemical Society of Japan", *Electrically Induced Wettability Change of Polyaniline, Potential Controlled Tensiometric Study*, (1998), pp. 1959-1932.

Vallet, M. and B. Berge, "Polymer", *Electrowetting of Water and Aqueous Solutions on Poly(ethylene terephthalate) Insulating Films*, (1996) vol. 37, No. 12, pp. 2465-2470.

Pollack, M.G., Shenderov, A.D. and Fair, R.B., "The Royal Society of Chemistry 2002", *Electrowetting-Based Actuation of Droplets for Integrated Microfluidics*, (2002) 2, pp. 96-101.

Pollack, Michael G. and Fair, Richard B., "Applied Physics Letters", *Electrowetting-Based Actuation of Liquid Droplets for Microfluidic Applications*, (2000), vol. 77, No. 11, pp. 1725-1726.

Lahann, Joerg et al., "Science", *A Reversibly Switching Surface*, (2003), vol. 299, pp. 371-374.

Berge, Bruno, "Acad. Sci. Paris", *Electrocapillarite et mouillaqe de films isolants par l'eau*, (1993), pp. 157-163.

* cited by examiner

TEST ELEMENT, SYSTEM, AND METHOD OF CONTROLLING THE WETTING OF SAME

REFERENCE TO RELATED APPLICATIONS

The present application is claims the priority of German Patent Application No. 10 2004 007 274.4, filed Feb. 14, 2004, which is hereby incorporated by reference in its entirety.

TECHNICAL FIELD

The invention relates to a test element for the testing of a liquid sample, such as body fluids, for an ingredient.

BACKGROUND

Glucose sensors, such as that found in WO 02/49507 A1 are known; likewise, micropumps, such as that found in WO 02/07503 A1, U.S. Pat. No. 6,565,727 B1 and U.S. 2003/0164295 A1 are known, each of the above being incorporated herein by reference.

SUMMARY

The invention relates to a test element for the testing of a liquid sample. The test element includes a sample application area, a test field, a sample transport path extending between the sample application area and the test field, and an actuator field including an electrically-conductive layer. The actuator field is switchable between a first state attracting the sample and a second state attracting the sample less than in the first state. The actuator field is switchable by applying an electric voltage that is different from an earth potential to the conductive layer. Further, the actuator field has a section that is arranged at about the same distance from the sample application area as the test field, measured along the sample transport path. Thus, by applying a voltage to the actuator field, a wetting of the test field by the sample applied to the sample application area can be controlled.

The present invention further relates to a test element analysis system for the testing of a liquid sample. The system includes a test element and an analytical device with a measuring facility, by which a measuring parameter that is characteristic of a test can be measured at the test element. The test element includes a sample application area, a test field, a sample transport path extending between the sample application area and the test field, and an actuator field including an electrically-conductive layer. The actuator field is switchable between a first state attracting the sample and a second state attracting the sample less than in the first state. The actuator field is switchable by applying an electric voltage that is different from an earth potential to the conductive layer. Further, the actuator field has a section that is arranged at about the same distance from the sample application area as the test field, measured along the sample transport path. Thus, by applying a voltage to the actuator field, a wetting of the test field by the sample applied to the sample application area can be controlled.

Still further, a method for controlling the wetting of a test element is provided. The method includes providing the test element, wherein the test element includes a sample application area, a test field, a sample transport path extending between the sample application area and the test field, and an actuator field including an electrically-conductive layer. The actuator field is switchable between a first state attracting the sample and a second state attracting the sample less than in the first state. The actuator field is switchable by applying an electric voltage that is different from an earth potential to the conductive layer. Further, the actuator field has a section that is arranged at about the same distance from the sample application area as the test field, measured along the sample transport path. The method further includes applying a liquid sample to the sample application area, and switching the actuator field from the first state to the second state, thereby controlling the wetting of the test field.

These and other features of the present invention will be more fully understood from the following detailed description of the invention taken together with the accompanying claims. It is noted that the scope of the claims is defined by the recitations therein and not by the specific discussion of the features and any advantages set forth in the present description.

BRIEF DESCRIPTION OF THE DRAWINGS

The following detailed description of the present invention can be best understood when read in conjunction with the following drawings. The features illustrated therein can be used individually or in combination in order to create further exemplary embodiments of the invention. Identical reference numbers identifies identical or corresponding parts. The following is depicted in the figures.

DETAILED DESCRIPTION

Figure 1:
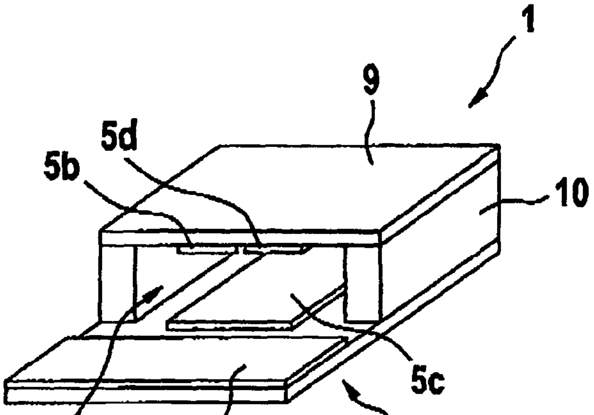
FIG. 1 shows an oblique view of a test element in accordance with the present invention.

In order that the invention may be more readily understood, reference is made to the following examples, which are intended to illustrate the invention, but not limit the scope thereof. Specifically, the following description is exemplary in nature and is in no way intended to limit the invention or its application or uses.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present invention.

For the purposes of describing and defining the present invention it is noted that the term “about” is utilized herein to represent the inherent degree of uncertainty that may be attributed to any quantitative comparison, value, measurement, or other representation. The term “about” is also utilized herein to represent the degree by which a quantitative representation may very from a stated reference without resulting in a change in the basic function of the subject matter at issue.

A test element according to the invention is provided. The test element includes a sample application area, a test field, a sample transport path extending between the sample application area and the test field, and an actuator field including an electrically-conductive layer. The actuator field is switchable between a first state attracting the sample and a second state attracting the sample less than in the first state. By suitable actuation of the actuator field, not only wetting of the test field can be controlled, but, in addition, the sample can be repelled by and removed from the test field and/or the sample application area, i.e. these can be de-wetted. A non-limiting example of controlling the wetting of the test field includes a setting of a starting time at which the test field is welted by the sample, which permits a time-controlled analysis of the sample. A further non-limiting example includes the controlling the wetting time of the test field by the actuator field assigned to the test field, such that a reproducible sample volume is used for each test. Still further, the actuator field can overcome hydrophobic repelling forces of the test field, if any.

The invention does not require the use of electro-osmotic or electromechanical pump systems. The sample can be moved to the actuator field assigned to the test field by capillary forces or, if the dimensions of the actuator field are appropriate, by the actuator field and guided to the test field. Moreover, it is also possible to arrange additional actuator fields on the sample application area in the vicinity of the test field or in a transport zone that connects the sample application area and the test field, whereby the additional actuator fields allow the sample to be put into motion. The additional actuator fields can be switchable barriers or actively support the flow of the sample.

In one embodiment, by dimensioning the actuator field suitably, for example in the form of a small strip leading from the sample application area to the test field, the area of the test field contacting the sample can be minimized. In this fashion, the risk of sample contamination is reduced. In another embodiment, the handling of the test element is simplified by extending the actuator field from the test field to the sample application area or if an additional actuator field is arranged at the sample application area. The use of an actuator field makes larger sample application areas possible and allows for significantly higher positioning tolerances. In this context, the one of the actuator field(s) are arranged on or adjacent to the sample application area.

In another embodiment, the test element includes multiple acturator fields. Moving the sample by one or multiple actuator fields allows the sample to be guided to and to wet the test field. This reduces the sample volume required for one test. In some applications, in particular in the withdrawal of body fluids with a micro-needle, the volume of an individual sample as withdrawn is very small. Especially if multiple actuator fields are used, one embodiment of the present invention allows several samples that were applied consecutively to the sample application area to be combined. Further, the switching of the actuator field combines the consecutive samples without the formation of bubbles. Still further, switching of the acturator provides for the wetting of the test element with the combined sample.

FIGS. 1 to 4 show various views of a test element 1 for testing a liquid sample, such as body fluids of humans or animals, for a medically significant ingredient. The test element 1 comprises a sample application area 2 for application of the sample 13 (FIG. 11*a*) for the test. For example, a drop of blood can be applied to the sample application area 2. In order to simplify the application of a liquid sample 13, the sample application area 2 can be provided with a transit orifice for a lancet such that a drop of blood adhering to the lancet can be wiped off on the transit orifice.

Figure 2:
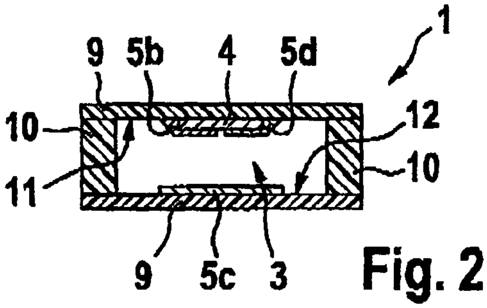
FIG. 2 shows a cross-section of the test element of FIG. 1.
Figure 3:
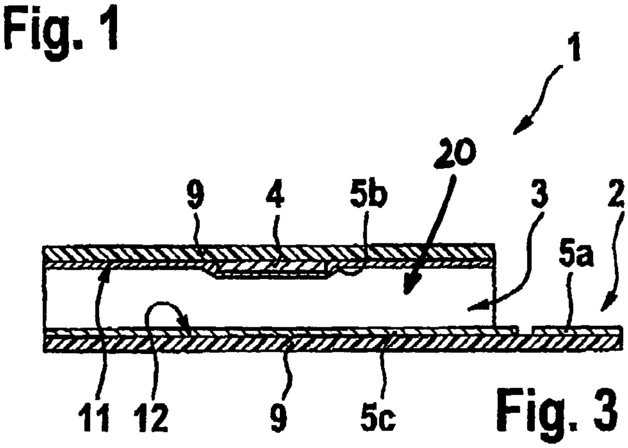
FIG. 3 shows a longitudinal view of the test element of FIG. 1.
Figure 4:
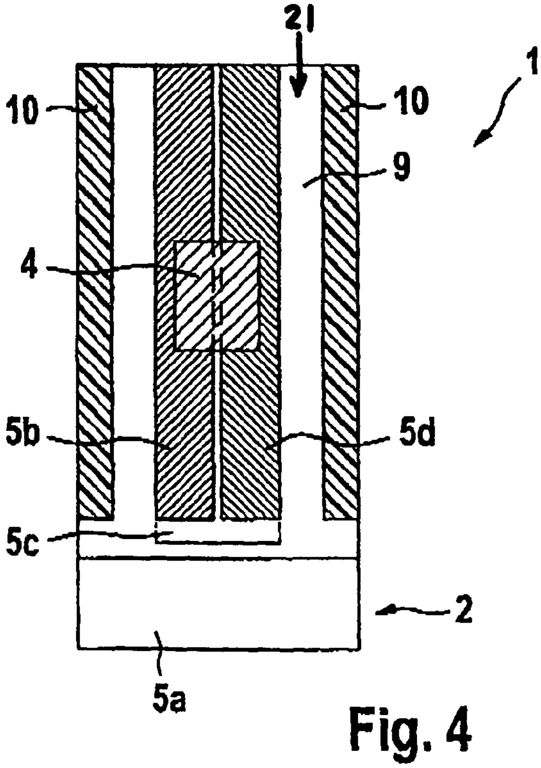
FIG. 4 shows a longitudinal view perpendicular to the longitudinal view shown in FIG. 3 of the test element of FIG. 1.

Adjacent to the sample application area 2 there is a transport zone 3, which connects the sample application area 2 and a test field 4 shown in FIGS. 2 to 4 and is provided in the form of a channel 20.

The test field 4, for example, contains a reagent (not shown), which reacts with an analyte present in the sample and thus leads to a change of a measuring parameter that is characteristic of the test. If the test element 1 is used in a test element analysis system comprising an analytical device and a measuring facility, the measuring facility can be used to measure a measuring parameter that is characteristic of the analysis and can be analyzed by the analytical device. An output facility, for example a display, can then be used to display the result of the test. A non-limiting example of a suitable test field 4 is, for example, in the form of a glucose detection-specific film, such as the one known from U.S. Pat. No. 6,036,919, issued Mar. 14, 2000, the specification of which is incorporated herein by reference. In said non-limiting example, if glucose is present in the sample, color development becomes visible in test field 4 after a few seconds. The endpoint of the reaction with the reagent present in the test field 4 is reached after about 30 to about 35 seconds. The color thus obtained can be correlated to the glucose concentration of the sample and is analyzed either visually or by reflection photometry. Alternatively, the test field 4 can be provided in the form of a micro-cuvette for spectroscopic testing of the sample. It is appreciated that any number of alternative test fields are possible in accordance with this disclosure depending upon the desired design requirements.

A sample applied to the sample application area 2 can be put in motion and guided to the test field 4 by the actuator fields 5*a*-5*d*. The actuator fields 5*b*-5*d* are assigned to the test field 4 and each comprise a section that is arranged at about the same distance from the sample application area 2 as the test field 4 such that a welting of the test field 4 by the sample applied to the sample application area 2 can be controlled by applying a voltage to the actuator fields. This distance from the sample application area 2 is to be measured along a sample transport path 21. The sample transport path 21 extends from the sample application area 2 to the test field 4. The sample can be transported on this sample transport path by actuator fields 5*a*-5*d*, or by capillary forces or the influence of gravity.

The actuator field 5*c* is assigned to the test field 4 by being positioned opposite from the field 4 such that a sample can penetrate into a gap formed between the actuator field 5*c* and the test field 4, and wet the test field 4. The actuator fields 5*b* and 5*d* are also assigned to the test field 4 and cover the field 4. The actuator fields 5*b* and 5*d* are permeable for the sample in that they comprise pores through which the sample can reach the test field 4. In principle, a single actuator field 5*b*-5*d* is sufficient to control the wetting of the field 4, but a test element 1 comprising multiple actuator fields 5*a*-5*d* is also contemplated. The test element with multiple actuator fields 5*a*-5*d* provides control over the sample flow and wetting of the test field 4, in particular when the individual actuator fields 5*a*-5*d* can be switched independently of each other.

The actuator field assigned to the test field 4, by which a wetting of the test field 4 can be controlled, may cover, for example, the test field 4, but, can also be arranged opposite from the test field 4 such that the sample can penetrate into a small gap between the actuator field and the test field 4. If it covers the test field 4, the actuator field can be provided with orifices 23 (FIG. 7), for example grid-like in shape, to allow the sample to reach the test field through the orifices of the actuator field. It is also possible to design the actuator field to be permeable for the sample, for example by providing it with pores.

Figure 5:
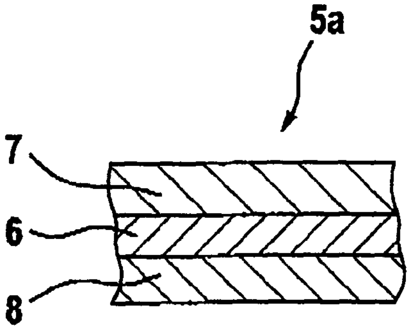
FIG. 5 shows a cross-section of an actuator field.

Each of the actuator fields 5*a*-5*d*, whose structure is illustrated in FIG. 5, comprises an electrically conductive layer 6 with an electrical connection. By applying an electrical voltage different from an earth potential to the conductive layer 6, the actuator field 5*a*-5*d* can be switched between a first state attracting the sample and a second state repelling the sample. As such, the second state attracts the sample less than in the first state. It is particularly facile to provide the electric connections for actuator fields 5*b*, 5*d* extending next to each other in longitudinal direction along the transport direction of the sample.

Whether two surfaces contacting each other attract or repel each other depends on a boundary energy existing in the area of contact. The density of electric charges on the two surfaces influences the level of this boundary energy. Therefore, it depends on the charge density on its surface whether the actuator field of a test element according to the invention is in its first attracting state or in its second repelling state. Applying an electric potential allowing the actuator to be switched similar to an electric capacitor can change this charge density. A boundary energy between two surfaces contacting each other can be reduced not only by direct current, but also by alternating current, which can be used to improve wetting. In the test element according to the invention the actuator field is switched, for example, by a direct current potential that can be provided by commercial batteries or for example by solar cells.

The actuator fields 5*a*-5*d* may, for example, include a hydrophilic surface in their first state and a hydrophobic surface in their second state; however, for the testing of oily sample, an actuator field 5*a*-5*c* can comprise a lipophilic surface in its first state and a lipophobic surface in its second state. Non-limiting examples of suitable materials for the electrically conductive layer 6 of the actuator fields 5*a*-5*d*, includes precious metals, such as for example gold. While not wishing to be bound to a specific theory, it is believed that since precious metals are very inert to reaction, undesired chemical reactions with the sample are prevented. Aside from precious metals, such as Au, Ag, Pt, metals such as Cr, Zn, Ni, Se, and Al, for example, and alloys containing these metals are also suitable for use with the present invention. As an alternative to metallic conductive layers, electrode materials such as indium-tin oxide or polyaniline can be used.

The electrically conductive layer 6 of the actuator fields 5*a*-5*d* is, for example, provided with a cover layer 7, which protects the electrically conductive layer 6 and suppresses a flow of current from the electrically conductive layer through the sample. The thickness of the cover layer is, for example, between about 5 and about 20 μm, further, about 10 μm, and the relative dielectric constant of its material is at least about 1, further at least about 2. In a layer with the thickness specified above, the cover layer 7 covers the conductive layer 6 completely and without gaps. Thicker layers require increasingly higher voltages in order to be able to change the attracting and/or repelling surface properties of the actuator fields 5*a*-5*d* during switching from the first to the second state to a sufficient degree to effect a transport of liquid sample. Using layers about 10 μm thick; voltages in the range of about a few volts are sufficient such that the test element 1 can be operated with a commercial battery. A relative dielectric constant of at least about 1, further about at least 2, facilitates that the charge densities at the cover layer 7, which are significant for a hydrophobic and/or a hydrophilic behavior, change to a marked degree.

The cover layer 7 is, for example, manufactured from a hydrophobic material. While not wishing to be bound to a specific theory, it is believed that in the hydrophobic material serves to counteract undesired migration of sample liquid and to provide stability for a long period of time.

Non-limiting examples of suitable materials for the cover layer 7 include, for example, TEFLON®, commercially available from DuPont, Wilmington, Del., TEFLON® AF commercially available from DuPont, Wilmington, Del., Parylene, polyimide, silicon oils, polyethyleneterephtalate, and materials forming self-associating monolayers such as thiols or xylylene. The cover layer can be applied onto the conductive layer using the following non-limiting examples: immersion, spraying or cast-coating procedures or by deposition from a vapor phase (CVD, PVD).

The conductive layer itself is arranged on a substrate 8, for which basically any metal, plastic material, glass or ceramic material can be selected. A non-limiting example from which substrate 8 is made includes silicon. While not wishing to be bound to a specific theory, it is believed that silicon allows for an appropriate doping of the substrate 8 to form connections on the conductive layer 6 in an integral fashion. In particular with regard to test elements, which are disposed after single use, substrate 8 is, for example, made of a plastic material, non-limiting examples of which include polycarbonate, polyamide, polypropylene, polyethylene, polystyrene, polyethyleneterephtalate or polyvinylchloride. Substrate 8 made of a plastic material, can be provided in the form of a film such that the actuator fields 5*a*-5*d* can be manufactured in the form of a flexible band in a cost-efficient way and can be adhered to the sample application area 2 or the transport zone 3 according to need in order to generate a test element 1.

Cover layer 7 comprises a substance that can be released by applying an electric voltage to the actuator field 5*a*-5*d*. A non-limiting example of this substance is a detergent that is adsorbed to the cover layer 7 and lowers the surface tension of the liquid sample after its release.

However, the use of a cover layer 7 is not obligatory. As an example, the adsorption of a sample ingredient on the conductive layer can be enhanced in a targeted fashion by applying a voltage, i.e. by changing the surface tension. A sample ingredient of this type can for example be plasma proteins whose adsorption on a gold surface depends on the voltage applied.

In the test element of FIGS. 1 to 4, the sample application area 2 is provided with an actuator field 5*a*. In order to simplify the application of a sample to the sample application area 2, the actuator field 5*a* is placed in the first state by applying a voltage that is different from earth potential. The sample 13, for example a drop of blood to be withdrawn at the skin of the patient, usually is at earth potential. As such, the sample is easy to apply to the sample application area 2 and is aspirated by the sample application area 2 upon even the slightest contact with the actuator field 5*a* of the sample application area 2.

The actuator field 5*a* of the sample application area 2 then moves the sample 13, which resides on the sample application area 2, such that the sample extends to the entry of the transport zone 3, which is provided in the form of channel 20. If, at this time, the actuator field 5*b* of the channel 20 is in its second state, premature penetration of sample into the channel 20 is prevented. In order to move the sample from the sample application area 2 via the transport zone 3, which is provided in the form of a channel 20, to the test field 4, the actuator field 5*b*, 5*c* of the transport zone 3 is placed in the first state by applying an electric voltage that is different from earth potential. This leads to the sample being aspirated into the channel 20 and thus being guided to the test field 4.

To support this movement, the actuator field 5*a* of the sample application area 2 is switched from the first, sample-attracting state to the second, sample-repelling state. In this fashion, the sample is removed nearly completely from the sample application area 2 and the sample application area 2 is de-wetted. While not wishing to be bound to a specific theory, it is believed that this switching minimizes the sample volumes required for a test, and has hygienic advantages, since cleaning to remove residual sample from the sample application area 2 is reduced and contamination risk of a subsequently tested other sample is reduced or even completely prevented.

If the transport zone 3 is provided in the form of a channel 20, as shown in FIGS. 1-3, it is sufficient to have a single actuator field 5*a* at the sample application area 2 allowing a sample drop 13 to be spread to the extent that it contacts the entry of the channel 20 such that it is subsequently aspirated into the channel 20 to the test field 4 by capillary forces.

As has been mentioned above, the transport zone 3 is provided in the form of a channel 20. It is contemplated that the transport zone 3 can also be implemented in the form of a free area or a groove between the sample application area 2 and the test field 4 or the test field 4 can even be arranged to be directly adjacent to the sample application area 2. However, a transport zone 3 being provided in the form of a channel 20 allows the sample to be protected from environmental influences in the channel 20. In addition, the test field 4 may also be arranged in the channel 20 to be largely protected from detrimental environmental influences, as is shown in FIGS. 3 and 4, and capillary forces existing in a channel can be used to support the transport of the sample.

There are various options for providing the channel 20. For example, the channel 20 may be in the form of a groove etched into a substrate, for example made of silicon, and be covered by a cover film 9. Technology for the processing of silicon substrates is available and enables the manufacture of substrates with structures on a micrometer scale. While not wishing to be bound to a specific theory, it is believed that silicon becomes inactivated upon contact with air by forming a silicon oxide surface that is chemically inert and tolerates well a contact with biological fluids, for example blood, saliva or glandular secretions, without exerting an undesirable adverse effect on the sample liquid. The channel may also be formed with spacers 10 (FIGS. 1 and 2) between an upper and a lower cover film 9 such that the spacers 10 form the side walls of the channel 20. Spacers 10 may be formed of basically plastic material, glass or ceramic material, however spacers made of plastics can allow for a flexible channel 20.

The geometric dimensions of the channel 20 are freely selectable. In one embodiment, the dimensions of the channel are selected such that the influence of capillary forces on the movement of a sample is not negligible and can support such movement. Consequently, the geometric dimensions of the channel 20 depend strongly on the viscosity and surface tension of the liquid sample to be tested. When the sample selected is human or animal body fluid, capillary widths of less than about 1 μm allow little, if any, sample transport to proceed. In this non-limiting example, channel widths and channel heights in the range of about 5 μm to about 2 mm are useful. Further, in this non-limiting example, the channel 20 has a channel height of about 50 to about 300 μm, further about 100 to about 300 μm, and still further about 100 to about 200 m. The channel width is adapted to the total sample volume to be taken up and, for example, is about 100 μm to about 1 mm. The cross-sectional area of the channel 20 is about 50 $\mu m^2$ to about 1 $mm^2$, further about $10^4$ to about $10^5$ $\mu m^2$.

In a non-limiting example, the cover film 9 can be manufactured from a hydrophilic material such that capillary forces support the movement of the sample in the channel. Hydrophilic properties of the cover film can be generated for example by covalently binding photoreactive hydrophilic polymers to a plastic surface, by applying cross-linking agent-containing layers or by coating with nano-composites by sol-gel technology, as is disclosed in EP 1035920 B1. However, the cover film 9 may be made of a hydrophobic material, which minimizes the contact area between sample and test element 1. In this fashion, potential contaminations of the sample can be reduced.

Figure 6:
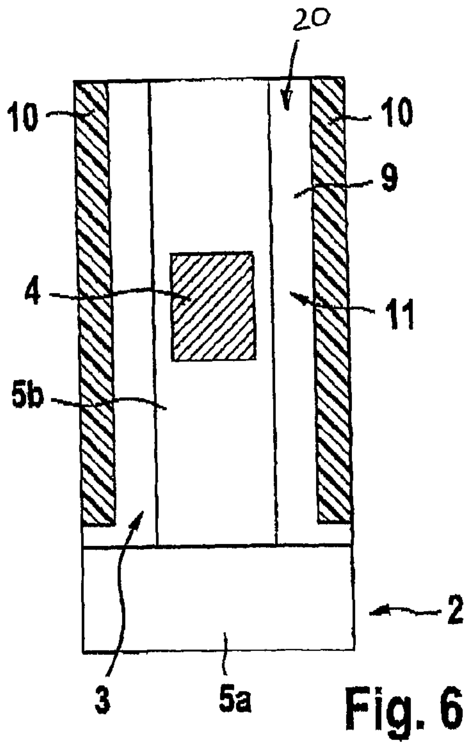
FIG. 6 shows a longitudinal view of another test element in accordance with the present invention.

FIG. 6 shows another embodiment of a test element 1 that differs from the test element of FIG. 4 in that the actuator field 5*a* of the sample application area 2 is positioned directly adjacent to the actuator field 5*b* of the transport zone 3. Depending on the type of sample liquid to be tested, a larger or lesser distance between neighboring actuator fields 5*a*-5*c* may be provided or neighboring actuator fields 5*a*-5*d* may be positioned directly adjacent to each other. In this context, the distance between neighboring actuator fields 5*a*-5*d* is selected such that, when a sample liquid wets an actuator field 5*a*-5*d*, an edge of the adjacent actuator field 5*a*-5*d* is also contacted automatically. Consequently, the distance depends especially on the viscosity and surface tension of the sample liquid. If neighboring actuator fields 5*a*-5*d* can be switched independently of each other, this arrangement of the actuator fields allows the sample to be moved in a controlled fashion from an actuator field 5*a*-5*c* to the neighboring actuator field 5*a*-5*d*. This means that the electrically conductive layers 6 of neighboring actuator fields 5*a*-5*d* should be electrically insulated from each other, which usually requires a minimal distance of about several hundred nanometers.

Figure 7:
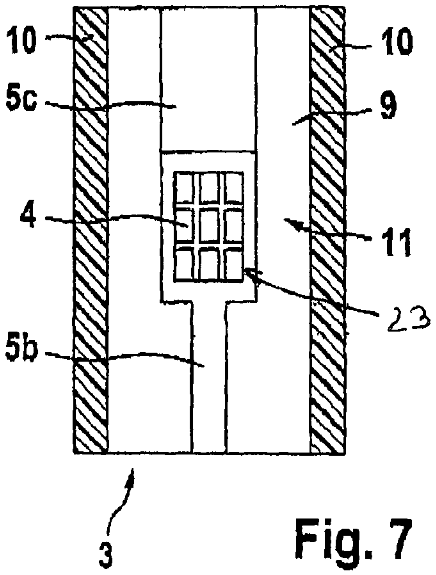
FIG. 7 shows a longitudinal view of another test element in accordance with the present invention.

An alternative embodiment of a test element 1 is shown in FIG. 7. The actuator field 5*b* has a narrower width in the channel 3 upstream of the test field 4 as seen from the sample application area 2 than the test element 1 of FIG. 6. If the surfaces of the channel 20 are hydrophobic, the narrow section of the actuator field 5*b* effects a reduction of the excess volume, which has to be at least partly filled to ensure that the test field 4 is completely wetted. If the actuator field 5*b* shown in FIG. 7 is in its first state, the channel 20 upstream of the test field 4 is filled to a lesser degree and consequently the sample volume required for a test is reduced. The wide section of the actuator field 5*c* downstream from the test field 4 allows for more rapid and more thorough removal of the sample after completion of the test. In the test element of FIG. 7, the actuator field 5*b* assigned to the test field 4 is arranged such that it covers the test field 4. In this area, the actuator field 5*b* is provided with orifices 23 facilitating the permeation of the sample towards the test field 4. As shown in FIG. 7, the actuator field 5*b* is grid- or screen-like in shape in the area of the test field 4.

Figure 8:
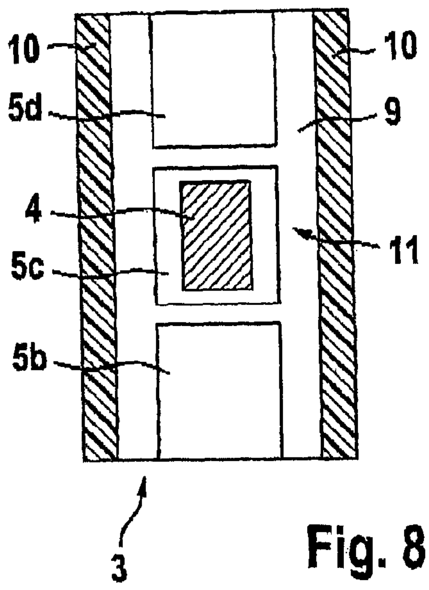
FIG. 8 shows a longitudinal view of another test element in accordance with the present invention.

FIG. 8 shows a longitudinal section through the transport zone of another exemplary embodiment of the test element 1. In this exemplary embodiment, the transport zone is provided with multiple actuator fields 5*b*-5*d*, which are adjacent to each other in longitudinal direction. These actuator fields 5*b*-5*d* are arranged at a distance to each other such that they can be switched independently of each other.

The arrangement of multiple actuator fields 5*b*-5*d* in the transport zone next to each other in longitudinal direction allows several samples, applied consecutively to the sample application area 2, to be combined in the transport zone and jointly guided to the test field 4. If, for example, the actuator field 5*b* is switched to be in its first state and the actuator field 5*c* is switched to be in its second state, the transport zone 3 in the area of the actuator field 5*b* is filled with sample, which can therein be stored there for a time until a second partial sample is received which can then be combined with the first sample. In this case, the actuator field 5*c* in its repelling state acts against the capillary forces acting in the channel 20 such that premature wetting of the test field 4 is prevented. By switching the actuator field 5*c* from the second to the first state, the sample can be guided to the test field 4 at a defined point in time to wet the test field 4.

In order to further improve the transport properties of the transport zone 3, it is preferred to arrange at least one actuator field 5*b*-5*d* each at an upper wall 11 and at a lower wall 12 of the channel 20. The actuator fields 5*b*-5*d* are arranged at the upper wall 11 and the lower wall 12 of the channel 20 in pairs and opposite to each other.

In this fashion, it is possible to exert a force effecting the transport of the liquid over a large area, which improves the control possibilities and prevents especially an undesired movement of the sample due to capillary forces. In the attracting state of the actuator fields 5*b*-5*d*, the capillary forces can be utilized to support the movement of the sample.

In order to simplify the removal of a sample from the channel 20, an actuator field 5*d* is arranged also in the channel down stream from the test field 4 as seen from the sample application area 2, of the exemplary embodiment shown.

Figure 9:
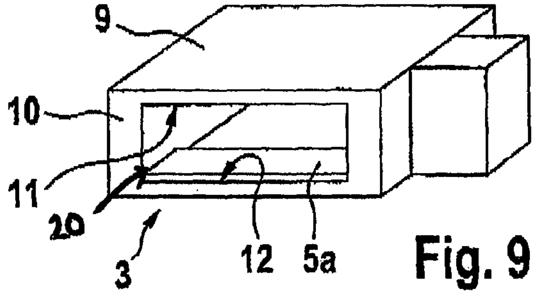
FIG. 9 shows an oblique view of another test element in accordance with the present invention.

FIG. 9 shows another exemplary embodiment of a test element 1, which differs from the test elements 1 described thus far in that the channel 20 comprises a branching site such that partial samples can be guided to various test fields 4 provided multiple branching sites with a test field of this type are arranged along the channel 20. As such, comparative or control measurements can be preformed as well as for example, multiple different tests for the detection of different substances in the sample.

Figure 10:
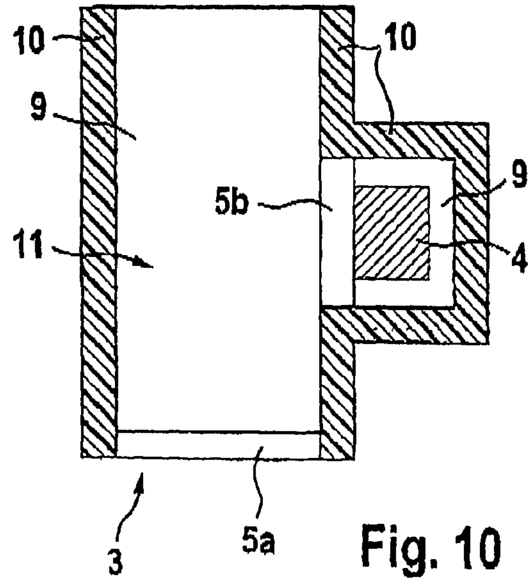
FIG. 10 shows a longitudinal view of the test element of FIG. 9.

As shown in FIG. 10, the actuator field 5*b*, arranged in the branching site directly upstream of the test field 4, can be used to prevent premature wetting of the test field 4 by the sample. In this fashion, it is for example possible to initiate testing at the same time in an additional test field 4 (not shown) that is provided at a second branching site (not shown), since the transport zone 3 can be filled with sample without the test field 4 being wetted.

Figure 11A:
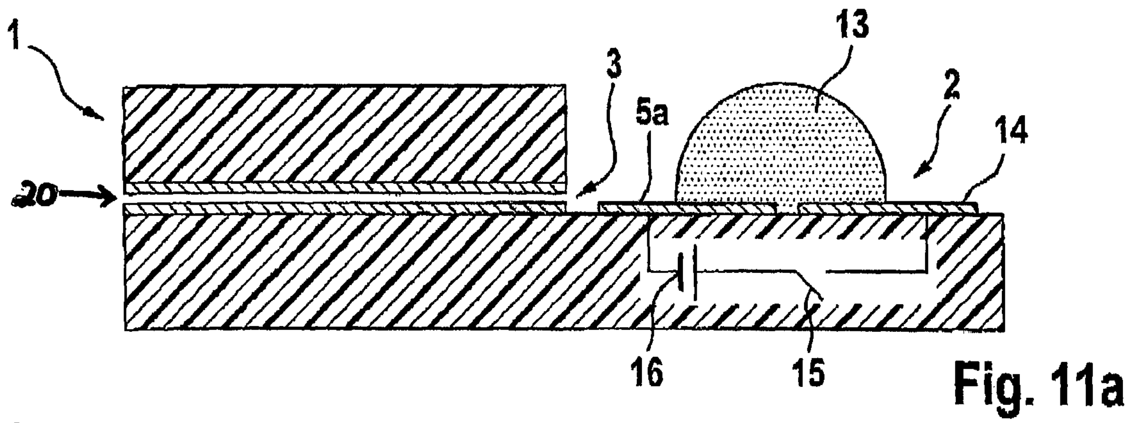
FIGS. 11*a*-11*c* show the spreading of a sample.
Figure 11B:
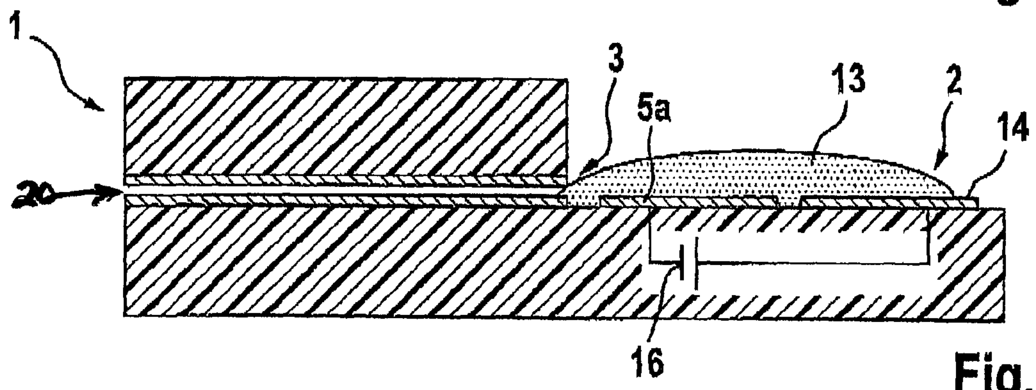
Figure 11C:
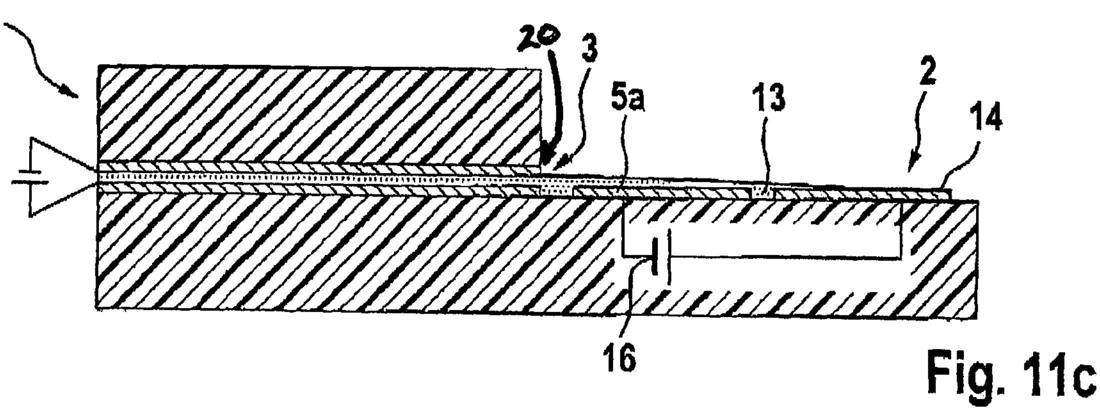

FIGS. 11*a*, 11*b*, and 11*c* illustrate the spreading of the sample 13 and its penetration into the transport zone 3, which is provided in the form of the channel 20.

Whether an actuator field 5*a*-5*d* is in its first or second state depends, as mentioned earlier, on the density of electric charges on its surface. The density of charges at the surface of the actuator field 5*a*-5*d* can be influenced by applying an electric voltage to the electrically conductive layer 6 of the actuator field and allows to switch the actuator field 5*a*-5*d* between the attracting and the repelling state. This is easiest to perform when the sample 13 is at earth potential, which usually is the case. In order to ensure that the sample 13 is at a defined potential, at earth potential, electrodes can be provided on the sample application area 2 and in the transport zone 3, which electrodes are at earth potential, for example, and thus ground the sample 13.

The switching of the actuator field 5*a* shown in FIGS. 11*a*-11*c* provides an alternative. In the test element of FIGS. 11*a-c*, an electrode 14 is arranged on the sample application area 2 adjacent to the actuator field 5*a*. The actuator field 5*a*, the electrode 14, the switch 15, and a power source 16 form an electric circuit. Closing the switch 15 causes the charge density on the actuator field 5*a* to be changed and the sample 13 to be spread such that it reaches the entry of the transport zone 3, which is provided in the form of channel 20. In the test element of FIGS. 11*a-c*, this is associated with the flow of a small current, for example on the order of about a few microampere, from the actuator field 5*a* through the sample 13 to the electrode 14.

As is indicated in FIG. 11*c*, it is also possible to apply a voltage to opposite walls of the channel 20 in order to support capillary forces in the transport of the sample into the channel 20.

Figure 12:
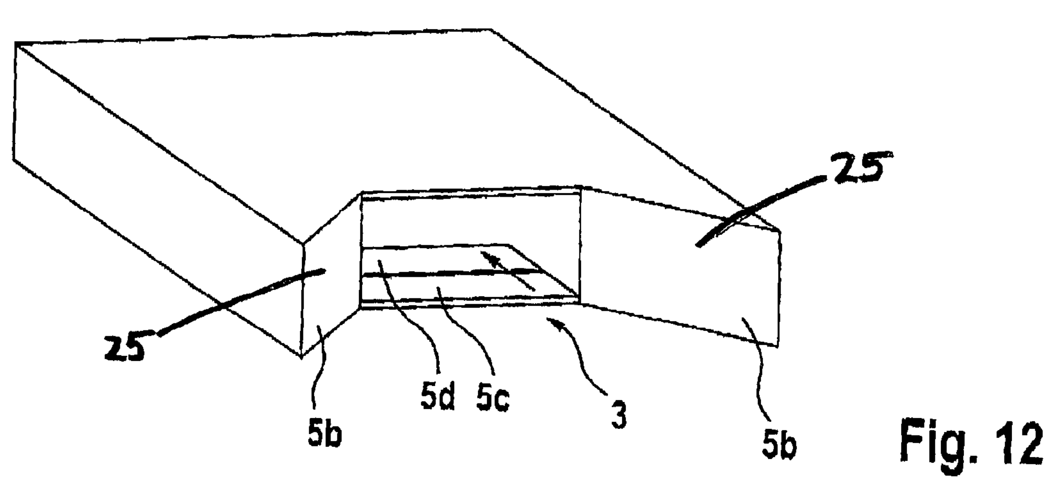
FIG. 12 shows another exemplary embodiment.

If transport zone 3 is provided in the form of a channel 20, it is often necessary to overcome resistance to allow the sample 13 to enter the channel 20. In the test element of FIG. 12, the entry area of the channel 20 is provided to be funnel-shaped for this reason, and the side walls 25 of this funnel-shaped area are covered by actuator fields 5*b*.

Figure 13:
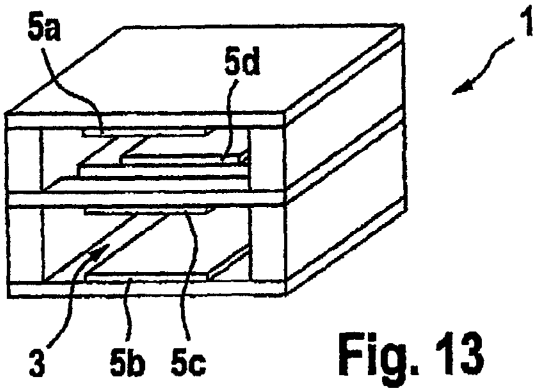
FIG. 13 shows an oblique view of another test element in accordance with the present invention.
Figure 14:
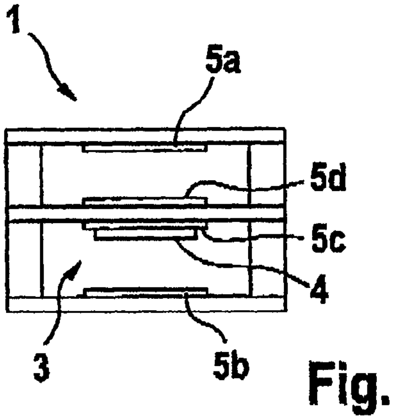
FIG. 14 shows a front view of the test element FIG. 13.
Figure 15:
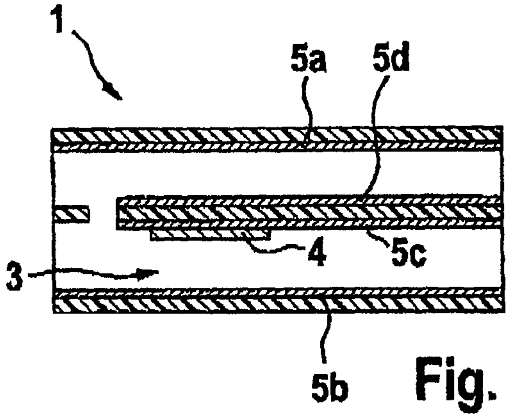
FIG. 15 shows a longitudinal view of the test element of FIG. 13.

Another embodiment of the present invention is illustrated in FIGS. 13 to 15. The test element 1 shown in FIGS. 13 to 15 in various views comprises a transport zone 3 that is provided in the form of a U-shaped channel. This measure allows not only the wetting of the test field 4, but also the filling direction of the test element to be controlled. For example, using the exemplary embodiment shown it is possible to jointly guide various samples to the test field 4.

Figure 16:
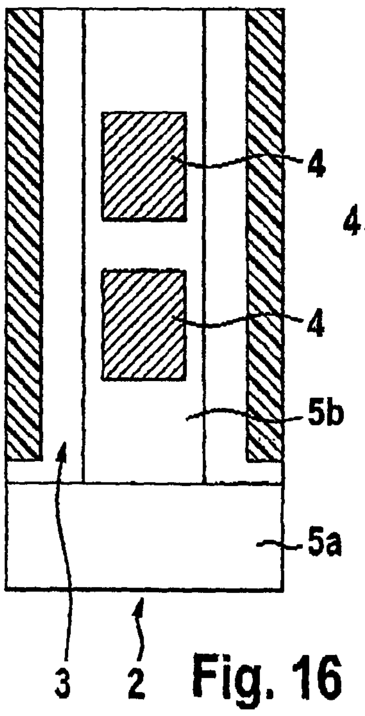
FIG. 16 shows a longitudinal view of another test element in accordance with the present invention.

FIG. 16 shows another embodiment of a test element 1 of the present invention with two test fields 4 arranged in sequence. One common actuator field 5*b* is assigned to both of these test fields 4 such that these are both wetted by the same sample in sequence. For example, a first test field 4 can be used to test the sample for a first medically significant ingredient and a second test field 4 can be used to test the sample for a second medically significant ingredient.

Figure 17:
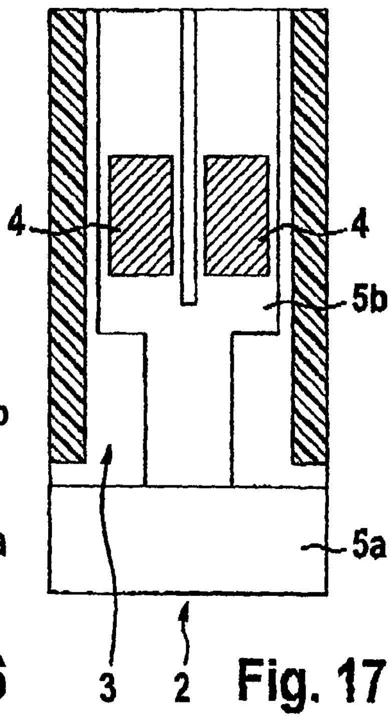
FIG. 17 shows a longitudinal view of another test element in accordance with the present invention.

FIG. 17 also shows another embodiment of a test element 1 of the present invention with two test fields 4. As before, in this embodiment the two test fields 4 are assigned to and covered by a common actuator field 5*b*. In contrast to the test element of FIG. 16, the transport zone of the test element of FIG. 17 branches into two arms, which extend parallel to each other. The two test fields 4 can be wetted by a sample simultaneously by switching the actuator field 5*b* adequately. As such, the same test can be performed under identical conditions in the two test fields 4 which can allow for a more accurate and reliable test result to be obtained.

Figure 18:
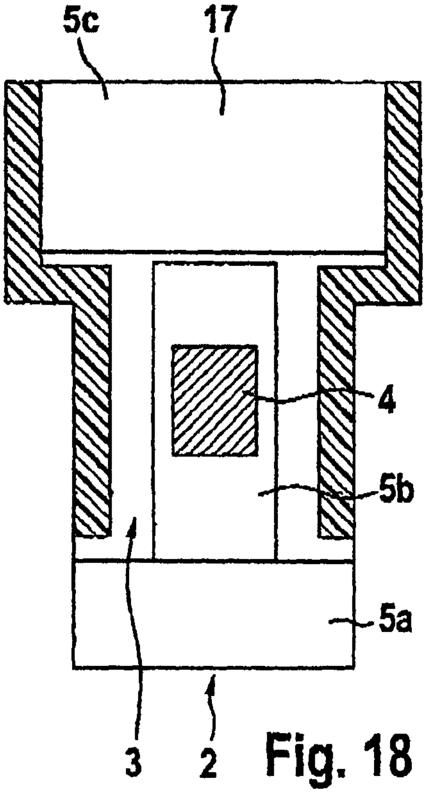
FIG. 18 shows a longitudinal view of another test element in accordance with the present invention.

FIG. 18 shows another embodiment of a test element 1 of the present invention, which comprises a sample removal area 17. The sample removal area 17 comprises its own actuator field 5*c* such that samples can be removed from the test element 1 by the sample removal area 17 after completion of a test.

Having described the invention in detail and by reference to specific embodiments thereof, it will be apparent that modification and variations are possible without departing from the scope of the invention defined in the appended claims. More specifically, it is contemplated that the present invention is not necessarily limited to the specific examples set forth above.

What is claimed is:

1. Test element for the testing of a liquid sample, the test element comprising:

a sample application area having an exposed surface on which a liquid sample can be applied;

a test field at which a measuring parameter that is characteristic of the test is measured, the test field comprising a reagent which reacts with a medically significant analyte present in the liquid sample to produce the measuring parameter, wherein the measuring parameter that is characteristic of the analysis can be measured with a measuring facility and can be analyzed by an analytical device to achieve a result of a test performed with the test element;

a sample transport path extending between the sample application area and the test field; and an actuator field assigned to the test field and including an electrically-conductive layer, the actuator field being switchable between a first state attracting the sample and a second state attracting the sample less than in the first state, the actuator field being switchable by applying an electric voltage that is different from an earth potential to the conductive layer, and wherein the actuator field comprises a section that is disposed along the sample transport path intermediate the sample application area and the test field, the section being arranged at about the same distance from the sample application area as the test field, measured along the sample transport path, such that by applying a voltage to the actuator field, a wetting of the test field which includes a spreading of the sample over the test field can be controlled.

2. The test element of claim 1, wherein the actuator field includes a second section that covers the test field.

3. The test element of claim 2, wherein the second section of the actuator field is permeable with regard to the sample.

4. The test element of claim 2, wherein the second section of the actuator field comprises orifices.

5. The test element claim 2, wherein the second section of the actuator field comprises pores.

6. The test element of claim 1, wherein the actuator field extends from the test field to the sample application area.

7. The test element of claim 1, wherein the sample application area is connected to the test field by a transport zone.

8. The test element of claim 7, comprising actuator fields.

9. The test element of claim 8, wherein the transport zone can be filled independently of a wetting of the test field by a sample applied to the sample application area by switching one of the actuator fields.

10. The test element of claim 8, wherein at least one of the actuator fields facilitates a spreading of the sample present on the sample application area.

11. The test element of claim 8, wherein the actuator fields extend next to each other in longitudinal direction along a transport direction of the sample.

12. The test element of claim 1, wherein the actuator field has a hydrophilic surface in the first state.

13. The test element of any claim 1, wherein the actuator field has a hydrophobic surface in the second state.

14. The test element of claim 1, wherein the level of the electric voltage can control a strength of an attracting force that can be exerted on the sample by the actuator field applied.

15. The test element of claim 14, wherein the level of the electric voltage can control a rate at which the sample migrates from the sample application area to the test field applied to the actuator field.

16. The test element of claim 1, wherein the sample application area is connected to the test field by a transport zone and the transport zone includes a channel.

17. The test element of claim 16, wherein the channel has a width of about 5 μm to about 2 mm.

18. The test element of claim 16, wherein the channel has a height of about 50μm to about 500 μm.

19. The test element of claim 16, wherein the channel has a cross-sectional area of about 50 μm to about $10^6$ μm.

20. The test element of claim 16, comprising actuator fields and at least one of the actuator fields is arranged at an upper wall and at a lower wall of the channel.

21. The test element of claim 16, wherein a cover film forms an upper wall of the channel.

22. The test element of claim 16, comprising actuator fields, wherein actuator fields are arranged on the upper wall and on the lower wall of the channel, and the actuator fields on the upper and lower walls are arranged in pairs and opposite to each other.

23. The test element of claim 1, wherein the actuator field is arranged on a cover film.

24. The test element of claim 23, wherein the cover film is a hydrophobic material.

25. The test element of claim 23, wherein the cover film is a hydrophobic material.

26. The test element of claim 1, wherein the actuator field comprises a cover layer covering the electrically conductive layer.

27. The test element of claim 26, wherein the cover layer is a hydrophobic material.

28. The test element of claim 26, wherein the cover layer comprises a substance that can be released by applying an electric voltage to the actuator field.

29. The test element of claim 28, wherein the substance is a detergent.

30. The test element of claim 1, wherein the sample application area is connected to the test field by a transport zone, the transport zone includes a channel, and the channel extends beyond the test field.

31. The test element of claim 30, comprising actuator fields and at least one actuator field is arranged in the channel downstream from the test field.

32. The test element of claim 31, wherein at least one actuator field is arranged downstream from the test field and has a larger width than at least one actuator field arranged in the channel upstream from the test field.

33. The test element of claim 31, wherein the actuator field is positioned to de-wet the sample application area of the sample upon switching the actuator field positioned at the sample application area.

34. The test element of claim 1, wherein the actuator field is positioned to remove the sample from the test field upon switching the actuator field.

35. The test element of claim 1, comprising a sample removal area formed to receive the sample after completion of a test.

36. The test element of claim 1, wherein the sample application area comprises two contact sites allowing the conductivity to be measured between the two contact sites.

37. The test element of claim 1, wherein two test fields are present, to which a partial volume each of the sample can be guided simultaneously by actuating actuator fields such that the two test fields can be wetted at about the same point in time and a measurement can be initiated on both test fields at about the same point in time.

38. A test element analysis system for the testing of a liquid sample, comprising:

a test element including a sample application area having an exposed surface on which a liquid sample can be applied, a test field at which a measuring parameter that is characteristic of the test is measured and comprising a reagent which reacts with a medically significant analyte present in the liquid sample to produce the measuring parameter, wherein the measuring parameter that is characteristic of the analysis can be measured with a measuring facility and can be analyzed by an analytical device to achieve a result of a test performed with the test element, a sample transport path extending between the sample application area and the test field, and an actuator field assigned to the test field and including an electrically-conductive layer, the actuator field being switchable between a first state attracting the sample and a second state attracting the sample less than in the first state, the actuator field being switchable by applying an electric voltage that is different from an earth potential to the conductive layer, and wherein the actuator field comprises a section that is disposed along the sample transport path intermediate the sample application area and the test field, the section being arranged at about the same distance from the sample application area as the test field, measured along the sample transport path such that a wetting of the test field which includes a spreading of the sample over the test field can be controlled by applying a voltage to the actuator field; and an analytical device with a measuring facility, by which a measuring parameter that is characteristic of a test can be measured at the test element.

39. The system of claim 38 comprising test elements.

40. A method for controlling the wetting of a test element, the method comprising the steps of:

providing the test element, wherein the test element includes a sample application area having an exposed surface, a test field, a sample transport path extending between the sample application area and the test field, and an actuator field assigned to the test field and including an electrically-conductive layer, the actuator field being switchable between a first state attracting the sample and a second state attracting the sample less than in the first state, the actuator field being switchable by applying an electric voltage that is different from an earth potential to the conductive layer, and wherein the actuator field comprises a section that is disposed along the sample transport path intermediate the sample application area and the test field, the section being arranged at about the same distance from the sample application area as the test field, measured along the sample transport path;

applying a liquid sample to the exposed surface of the sample application area;

switching the actuator field from the first state to the second state, thereby controlling the wetting of the test field, which wetting includes a spreading of the sample over the test field; and reacting a reagent of the test field with an analyte present in the liquid sample and measuring a measuring parameter at the test field that is characteristic of the test, wherein the measuring parameter that is characteristic of the analysis can be measured with a measuring facility and can be analyzed by an analytical device to achieve a result of a test performed with the test element.

41. The method of claim 40, wherein consecutive samples are applied to the sample application area.

42. The method of claim 40, wherein the switching of the actuator field guides the consecutive samples to the test field.

43. The method of claim 40, wherein the switching of the actuator field combines the consecutive samples without the formation of bubbles.

44. The method of claim 40, wherein the reagent is dry before contact by the liquid sample.

45. The test element of claim 1, wherein the reagent is configured to be maintained dry before contact with the liquid sample having the medically significant analyte.

46. The test element of claim 38, wherein the reagent is configured to be maintained dry before contact with the liquid sample having the medically significant analyte.

* * * * *